April 28, 1931. E. HAYNSWORTH ET AL 1,802,647
ELECTRICAL CONTROL SWITCH FOR VEHICLES
Filed Oct. 20, 1925
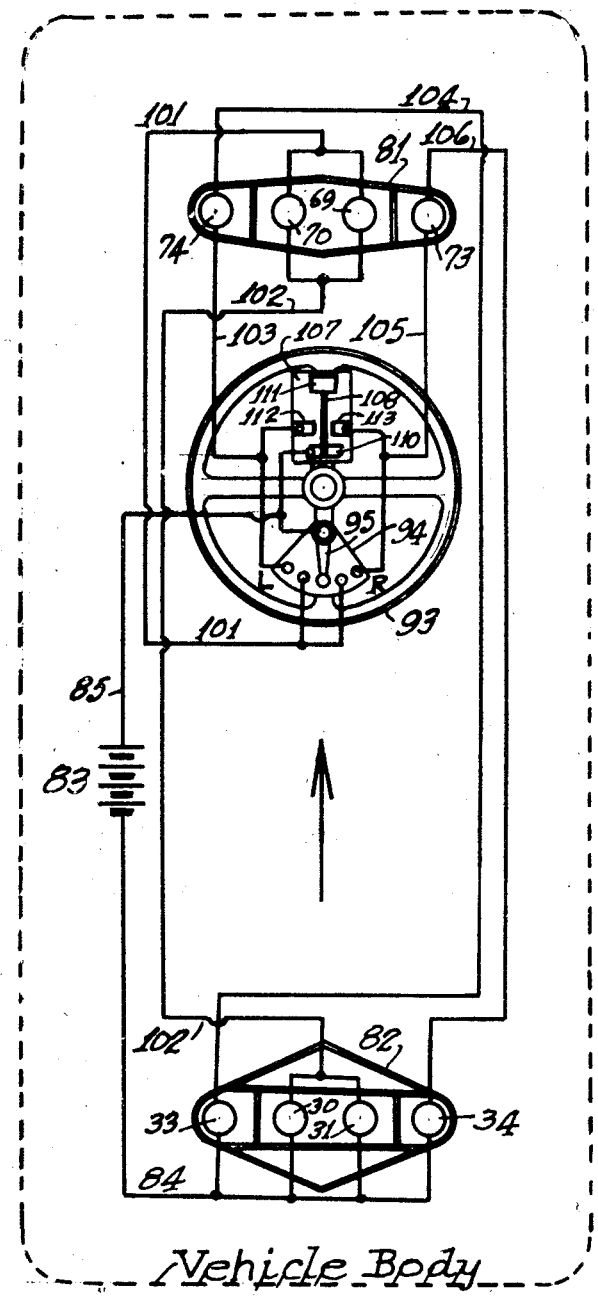
INVENTOR.
Ethel Haynsworth,
Matthew Francis Haynsworth,
BY
ATTORNEY.

Patented Apr. 28, 1931

1,802,647

UNITED STATES PATENT OFFICE

ETHEL HAYNSWORTH AND MATTHEW FRANCIS HAYNSWORTH, OF NEW YORK, N. Y.

ELECTRICAL CONTROL SWITCH FOR VEHICLES

Application filed October 20, 1925. Serial No. 63,589.

This invention relates to a circuit controlling system for vehicles and the apparatus used therewith and it may be used to operate signals of the light type such as are used as direction and stop signals for automobiles. An object of the invention is the provision of means for automatically controlling a circuit by an inertia device mounted on the steering wheel. Other objects of the invention reside in certain novel features in the construction of the device as more particularly described in the following specification and shown in the accompanying drawing showing one arrangement of circuits and controlling devices according to this invention.

The use of light signals on the rear of automobiles for indicating when the vehicle is about to turn or stop is quite common practice. This invention may be used with this class of signal and the signal device embodies the tail light, direction light and a stop or caution signal to be displayed as occasion demands. The direction light is made up of a central portion or bar to which an arrow head is selectively displayed at either end according to the direction in which the vehicle is about to turn.

These signal indications are controlled from a manually operated switch conveniently located on the steering wheel of the vehicle. In addition to the manual control the direction signal may be controlled by an "inertia" switch mounted on the steering wheel so that the comparatively quick movement of this wheel for a turn will cause this switch to selectively close the circuit of the direction signal or other device for a short interval as the vehicle is about to turn.

The drawing shows a vehicle body in dotted outline moving in the direction of the arrow normally and having a signal device 81 in front and another signal device 82 in the rear. These signal devices give their indications by light in suitable compartments as hereinafter described. The steering wheel 93 has mounted thereon a hand switch 94 for controlling the signal devices manually, and also an automatic switch 107 embodying an inertia device which operates under certain conditions to selectively close a circuit including the lamp bulbs of the signal devices. By illuminating the separate compartments of the signal device, suitable indication can be given with reference to the steering of the vehicle.

The arrangement in the figure shows the lamp bulbs in each device connected in series circuit. Starting at the battery 83 a return circuit is provided on wire 84. The operating circuit starting from wire 85 connects to the switch lever 95 which, when moved to the left energizes wires 103 and 101. The circuit of bulbs 33 and 74 is connected in series by wire 104. When the switch lever is moved to the right, wire 105 is energized and bulbs 34 and 73 are connected in series with this wire by wire 106. When wire 101 is energized the bulbs 30 and 31 and bulbs 69 and 70 are connected in series-multiple on wire 102.

An inertia switch 107 may be used additional to the manual control shown. This switch is secured to one of the arms of the steering wheel 93 as shown and comprises a flat horizontal spring 108 with a weight 111 at its outer end. This spring is rigidly mounted at 110 so that the flat side is vertical and swings between the contacts 112 and 113. When the weight 111 swings to the left, wire 103 is energized and when this weight swings to the right wire 105 is energized producing directional signals accordingly. The weight 111 is, preferably, placed away from the centre of the steering wheel so that as this wheel makes a quick turn the weight does not respond owing to its inertia and a circuit is made between contacts 112 or 113 and 110. This circuit is established by the initial rapid movement of the wheel and before the car actually starts to turn, thus, should the operator fail to operate the switch lever 95, this inertia switch will give the direction signal.

It will be observed that the contacts 112 and 113 are close to the fixed end of bar 108 so that initial movements of weight 111 will not establish a circuit, such, for instance as might be obtained in directing a car around other cars on the road. The operating point of this switch can be adjusted by the position of the weight on the spring 108. As soon as the tension of the spring 108 has overcome the intertia of the weight it is apparent that the circuit will be opened. It should be noted that the inertia spring 108 is freely mounted to swing both ways from the neutral position and after a movement of the steering wheel operating the signal, it is free to assume the neutral position or to swing to the opposite position upon restoring the steering wheel for normal running; however, as the system is intended to indicate the desire of the driver to make a turn and the car follows the direction of the initial signal.

Having thus described our invention, we claim:

1. An electrical control switch for vehicles having a steering wheel, comprising a vertical flat spring mounted horizontally on said steering wheel, in the normal line of movement of the vehicle, fixed at one end and weighted at the opposite end and free to move by the inertia of said weight and a contact spaced from said spring near its fixed end connected with a circuit and arranged to co-operate with said spring in establishing said circuit.

2. An electrical control switch for vehicles having a steering wheel, comprising a spring member mounted horizontally on said steering wheel, in the normal line of movement of the vehicle, said spring being fixed at one end and weighted at the opposite end and free to move by the intertia of said weight and a contact spaced from said spring in its normal position and associated with a circuit and arranged to co-operate with said spring in controlling said circuit.

Signed at New York, in the county of New York and State of New York, this 17th day of October, A. D. 1925.

ETHEL HAYNSWORTH.
MATTHEW FRANCIS HAYNSWORTH.